(12) United States Patent
Prasanna et al.

(10) Patent No.: US 9,767,126 B2
(45) Date of Patent: *Sep. 19, 2017

(54) STORING AND PROCESSING DATA ORGANIZED AS FLEXIBLE RECORDS

(71) Applicant: Tactile, Inc., Redwood City, CA (US)

(72) Inventors: Dhananjay Prasanna, San Francisco, CA (US); Matthew Kent, San Francisco, CA (US); Kyle Glendon Shank, Newburyport, MA (US); Kurtis L. Seebaldt, San Francisco, CA (US)

(73) Assignee: Tactile, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/239,620

(22) Filed: Aug. 17, 2016

(65) Prior Publication Data

US 2017/0004150 A1 Jan. 5, 2017

Related U.S. Application Data

(63) Continuation of application No. 14/209,896, filed on Mar. 13, 2014, now Pat. No. 9,449,061.

(60) Provisional application No. 61/789,413, filed on Mar. 15, 2013.

(51) Int. Cl.
*G06F 17/30* (2006.01)

(52) U.S. Cl.
CPC .. *G06F 17/30292* (2013.01); *G06F 17/30312* (2013.01); *G06F 17/30368* (2013.01); *G06F 17/30563* (2013.01); *G06F 17/30569* (2013.01); *G06F 17/30575* (2013.01)

(58) Field of Classification Search
CPC ......... G06F 17/30575; G06F 17/30312; G06F 17/30563

USPC ................................................. 707/610, 741
See application file for complete search history.

(56) References Cited

U.S. PATENT DOCUMENTS

| | | | | |
|---|---|---|---|---|
| 6,850,974 B2* | 2/2005 | Schweitzer | ........... | H04M 15/31 707/E17.005 |
| 6,985,941 B2* | 1/2006 | Schweitzer | ........... | H04M 15/31 379/111 |
| 7,346,675 B2* | 3/2008 | Givoly | ................... | G06Q 30/02 707/999.007 |
| 8,396,894 B2* | 3/2013 | Jacobson | .......... | G06F 17/30477 707/793 |
| 8,442,982 B2* | 5/2013 | Jacobson | .......... | G06F 17/30657 707/711 |

(Continued)

OTHER PUBLICATIONS

United States Office Action, U.S. Appl. No. 14/209,896, Dec. 7, 2015, 13 pages.

*Primary Examiner* — Jean M Corrielus
(74) *Attorney, Agent, or Firm* — Fenwick & West LLP (57) ABSTRACT

A system and method are disclosed for persisting data received from disparate data sources having different internal schemas. In operation, a data processing engine aggregates related data received from the different data sources and organizes the aggregated data into flexible records. A flexible record is a composite of associated fields aggregated from a set of records received from one or more data sources. Each field associated with a flexible record includes data received from a particular data source and specifies the particular data source as the source of the data. Flexible records are stored in a storage repository, and each flexible record is associated with at least one user who accesses data via a client device.

20 Claims, 9 Drawing Sheets

(56) References Cited

U.S. PATENT DOCUMENTS

| | | | |
|---|---|---|---|
| 2002/0120624 A1* | 8/2002 | Givoly | G06Q 30/02 |
| 2006/0173926 A1* | 8/2006 | Kornelson | G06F 17/30563 |
| 2008/0222121 A1 | 9/2008 | Wiessler et al. | |
| 2011/0289050 A1* | 11/2011 | McCarthy | G06F 17/30165 |
| | | | 707/617 |
| 2012/0016901 A1* | 1/2012 | Agarwal | G06F 17/30569 |
| | | | 707/769 |
| 2012/0117116 A1* | 5/2012 | Jacobson | G06F 17/30657 |
| | | | 707/792 |
| 2012/0131000 A1 | 5/2012 | Suneja et al. | |

\* cited by examiner

| Record ID | Source ID | Event Type | Field Name | Field Value | Time | Remote ID | User ID |
|---|---|---|---|---|---|---|---|
| 001 | 999 | Insert | First Name | John | 1393... | 123 | 232 |
| 001 | 999 | Insert | Last Name | Smith | 1393... | 123 | 232 |
| 001 | 999 | Insert | DOB | 2/5/... | 1393... | 123 | 232 |
| 001 | 999 | Insert | State | CA | 1393... | 123 | 232 |
| 001 | 999 | Insert | Phone | 335-... | 1393... | 123 | 232 |
| 001 | 999 | Modify | Last Name | Park | 1395... | 123 | 232 |

STORING AND PROCESSING DATA ORGANIZED AS FLEXIBLE RECORDS

CROSS REFERENCE TO RELATED APPLICATIONS

This application is a continuation of U.S. patent application Ser. No. 14/209,896, filed Mar. 13, 2014 and entitled "Storing and Processing Data Organized as Flexible Records", which claims a benefit and priority under 35 U.S.C. §119(e) to U.S. Provisional Patent Application Ser. No. 61/789,413, filed Mar. 15, 2013 and entitled "Storing and Processing Data Organized as Flexible Records." The content of each of the foregoing is incorporated herein in its entirety.

BACKGROUND

Field of Art

The disclosure generally relates to the field of data management and specifically to storing and processing data organized as flexible records.

Description of the Related Art

Data stores typically consist of a system of tables that model application data in a structure of grouped fields known as a schema. Each of these fields has an assigned type and other constraints, such as character, byte-width and validity specifications. For example, a numeric field may only contain numbers up to a certain predetermined storage limit.

For data aggregation systems that collect data fields from several sources, such a rigid data storage infrastructure has several limitations. First, each source has its own set of fields which are described in a particular schema. Storing data from different sources in a rigid data store schema would thus require maintaining a separate schema for each source. Second, a particular data source may update its schema at any time, and the data store of the data aggregation system would need to be similarly altered requiring infrastructure changes and expensive data movement operations.

Accordingly, there is a need for a system that enables the storage of data fields received from different sources in a flexible manner.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Processing Overview

Figure 1:
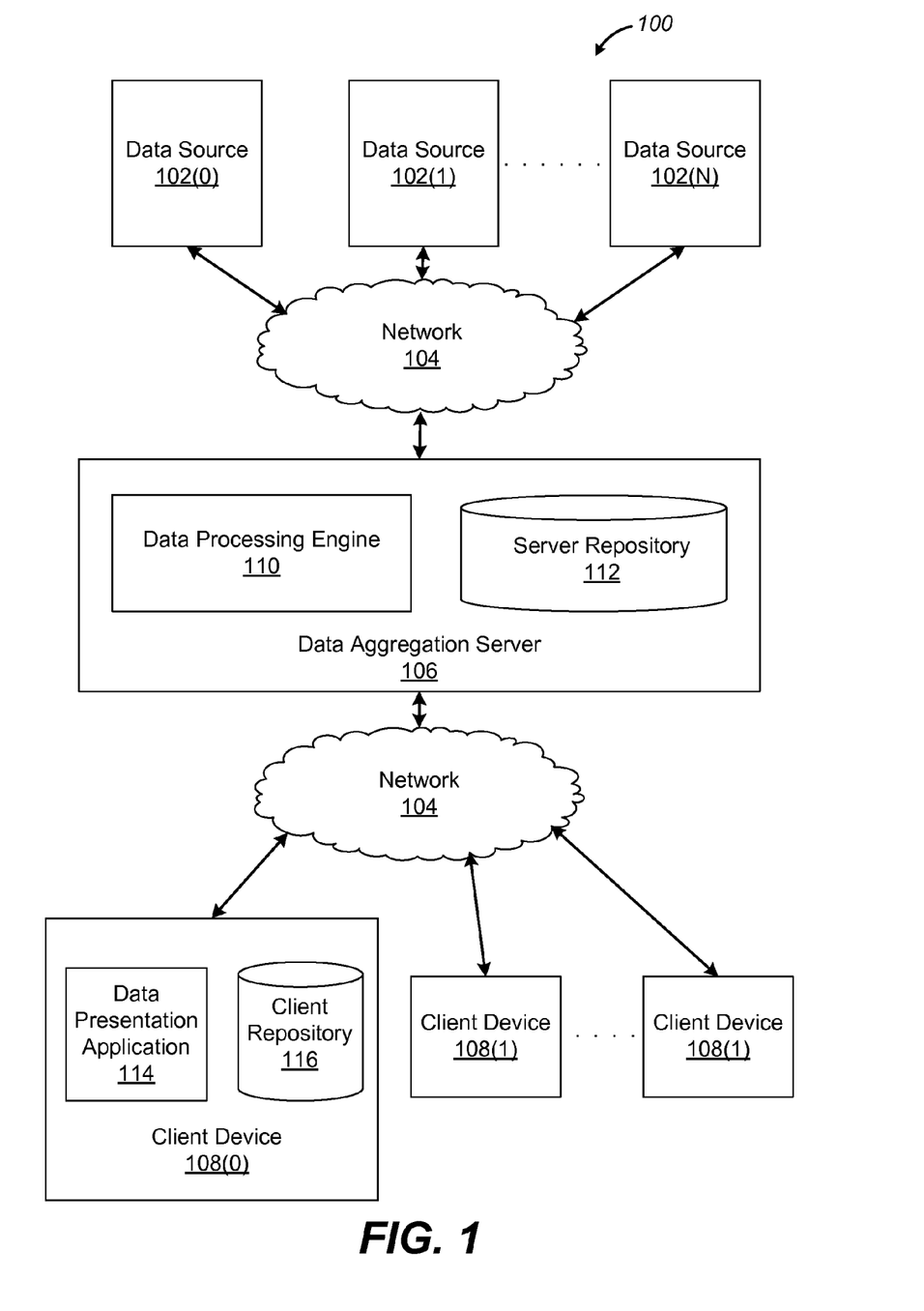
FIG. 1 illustrates one embodiment of a computing environment configured to coalesce data from several sources and provide the coalesced data to client applications.

FIG. 1 illustrates one embodiment of a computing environment 100 configured to coalesce data from several sources and provide the coalesced data to client applications. As shown, the computing environment 100 includes data sources 102(0) . . . 102(N) (generally, data sources 102), a data aggregation server 106 and a client device 108. The data sources 102, the aggregation server 106 and the client device 108 are communicatively coupled to one another through a network 104. Although only one aggregation server 106 and client device 108 are illustrated, the computing environment 100 may include multiple instances of each entity. Moreover, some of the functions ascribed to the aggregation server 106 may be performed by the client device 108 and vice versa. Other entities may also be coupled to the network 104.

Data sources 102 are part of a system that manages and stores data associated with individuals or groups of individuals. For example, a data source 102 may be a customer relationship management (CRM) system or a human resource (HR) management system. Each data source 102 stores data according to a fixed database schema. For example, data source 102(0) may store a user's contact data according to a schema that stores a record per contact, each record being associated with one or more fixed fields. In one embodiment, data storage schemas across different data sources may vary significantly even when storing the same type of data. Each data source 102 provides a channel for accessing and updating data stored within the data source 102.

The data aggregation server 106 includes a data processing engine 110 and a server repository 112. The data processing engine 110 accesses data stored within the data sources 102 via the channels provided by each data source 102. The data processing engine 110 aggregates related data received from the different data sources 102 and organizes the aggregated data into flexible records. A flexible record is a composite of associated fields aggregated from a set of records received from one or more data sources 102. Each field associated with a flexible record includes data received from a particular data source 102 and specifies the particular data source 102 as the source of the data. Flexible records are stored in the storage repository 112, and each flexible record is associated with at least one user who accesses data via a client device, such as client device 108, communicating with the data aggregation server 106.

In operation, when a user creates an account with the data aggregation server 106, the user identifies one or more data sources 102 that store data associated with the user. In one embodiment, the aggregation server 106 automatically, without user intervention, identifies the data sources 102 that store data associated with the user based on the user's location, name, organization affiliation, etc. The data processing engine 110 retrieves from each identified data source one or more records storing data associated with the user.

The records retrieved from different data sources may store related data but may be structured according to different schemas. The data processing engine 110 aggregates the records and stores the aggregated records as flexible records in the storage repository 112. In one embodiment, multiple users may be associated with the same data in one or more data sources 102. In such an embodiment, the data processing engine 110 does not generate multiple flexible records storing the same data but associates the multiple users with the same flexible record storing the data.

Data stored in the server repository 112 that is associated with a particular user is transmitted to the client device 108 operated by the user for presentation in the data presentation application 114. Data received from the server repository 112 is stored in the client repository 116. The data presentation application 114 retrieves data stored in the client repository 116 and allows users to view and interact with the data as well as modify the data if necessary. Any modifications made to the data are stored in the client repository 116 and also transmitted by the data presentation applications 114 to the data processing engine 110.

The data processing engine 110 tracks all modifications made via the data presentation application 114 to data that is also stored in the server repository 112. In one embodiment, the data processing engine 110 identifies a particular data field stored in the server repository 112 that was modified via the data presentation application 114. The data processing engine 110 transmits the modified data to the data source 102 specified in the data field. In such a manner, a data field that is modified on the client device 108 may be synchronized with the data field stored in the server repository 112 as well as the data source 102 from which the data associated with the data field was originally retrieved.

The network 104 represents the communication pathways between the bookshelf server 104, client device 112, and any other entities on the network. In one embodiment, the network 104 is the Internet and uses standard communications technologies and/or protocols. Thus, the network 104 can include links using technologies such as Ethernet, 802.11, worldwide interoperability for microwave access (WiMAX), 3G, long term evolution (LTE), digital subscriber line (DSL), asynchronous transfer mode (ATM), InfiniBand, PCI Express Advanced Switching, etc. Similarly, the networking protocols used on the network 104 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 104 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

Figure 2:
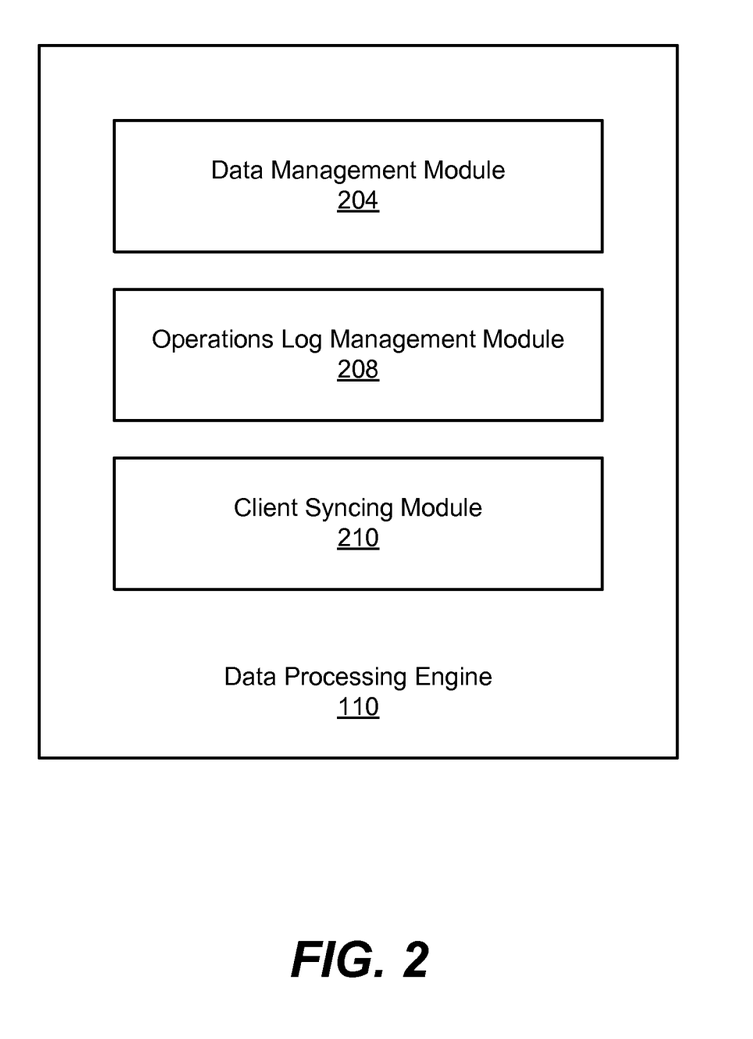
FIG. 2 illustrates an embodiment of the data processing engine of FIG. 1.

FIG. 2 illustrates an embodiment of the data processing engine 110 of FIG. 1. As shown, the data processing engine 110 includes a data management module 204, an operations log management module 208 and a client syncing module 210.

The data management module 202 receives data associated with a particular user from various data sources 102. The data management module 202 processes the data by performing various operations before the data is stored in the server repository 112. Data de-duplication is one operation performed on the data by the data management module 202 to remove duplicate data received from different data sources 102. For example, if two data sources 102 include contacts associated with the user, the contact data received from the two data sources 102 may include several duplicate contacts. In such a situation, the data management module 202 performs a de-duplication operation on the contact data to remove duplicate contacts.

The data management module 202 analyzes the processed data and aggregates data fields related to the same object. An object includes any data structure having multiple attributes, where the value of each attribute is specified in a different data field. Examples of objects include contacts, documents, calendar items, etc. For each object, the data management module 202 transmits all the data fields related to the object to the operations log management module 208 for storing in the server repository 112 as a flexible record.

When data fields are stored as a flexible record in the server repository 112, each data field is stored separately and all the data fields of the flexible record are associated with the same record identifier. For example, for a first name field of a contact flexible record, storing the first name field separately may take the form of: record_id: 123, name: "first_name", value: "Chuck." Each of the remaining data fields of the contact flexible record, such as last name, phone number, email, etc., are stored similarly. The record identifier, i.e., record_id: 123, remains the same across all data fields of the contact flexible record. In such a manner, related data fields that are retrieved from sources 102 having disparate schemas are stored in the server repository 112 in a flexible and easily scalable structure. Specifically, any number of related data fields may be modeled by associating the related data fields with the same record identifier.

The operations log management module 208 maintains an operations log in the server repository 112 for storing flexible records that include data fields retrieved from the data sources 102, updated by the data presentation application 114 and/or generated by the data presentation application 114. An operations log includes multiple rows, where each row is associated with a unique combination of a user identifier, a data field and a timestamp reflective of an event related to the data field. Examples of events related to the data field include insertion of a data field, editing of a data field or deleting data field. Each row includes the value of the data field after the event. Further, each row includes the source of the data field, such as the particular data source 102 from which the data field was first retrieved, and the remote identifier of the data field in the source system.

When the data presentation application 114 is first installed on the client device 108, the operations log management module 204 receives a request from the data presentation application 114 for data associated with a particular user. The operations log management module 204 identifies all the rows in the operations log in the storage repository 112 that are associated with the particular user. The operations log management module 204 then generates a client operations log that stores the identified rows and transmits the client operations log to the client device 108 for storage in the server repository 116. The data presentation application 114 interacts with the client operations log to access, modify or insert data fields. Each operation performed by the data presentation application 114 on a data field is captured in a new row of the client operations log indicating the operation that was performed and the value of the data field after the operation.

In one embodiment, any modifications made to the client operations log are transmitted back to the operations log management module 208. The operations log management module 208 analyzes modifications to the client operations logs received from the various client devices 108 and optionally updates the operations log in the server repository 112 based on the received modifications. In synchronizing, the operations log management module 208 may perform one or more conflict resolution operations if necessary.

The operations log management module 208, upon modifying the operations log in the server repository 112, may also propagate the updates to the data sources 102 from which the data fields were originally received. In operation, for each modified data field, the operations log management module 208 determines the source of the data field and the remote identifier of the data field in the source. The operations log management module 208 transmits the modified data of the data field in conjunction with the remote identifier to the source. The source may optionally update its internal data stores to reflect the modifications made to the data field.

The client syncing module 210 periodically transmits any updates made to data fields in the operations log stored in the server repository 112 to the client operations log. For example, when a data field in a data source 102 changes, the changed value of the data field is transmitted to the operations log management module 204. The operations log management module 204 inserts a new row in the operations log stored in the server repository 112 indicating the changed value of the data field. The client syncing module 210 transmits the changed value to the client repository 116 for storage in the client operations log.

Figure 3:
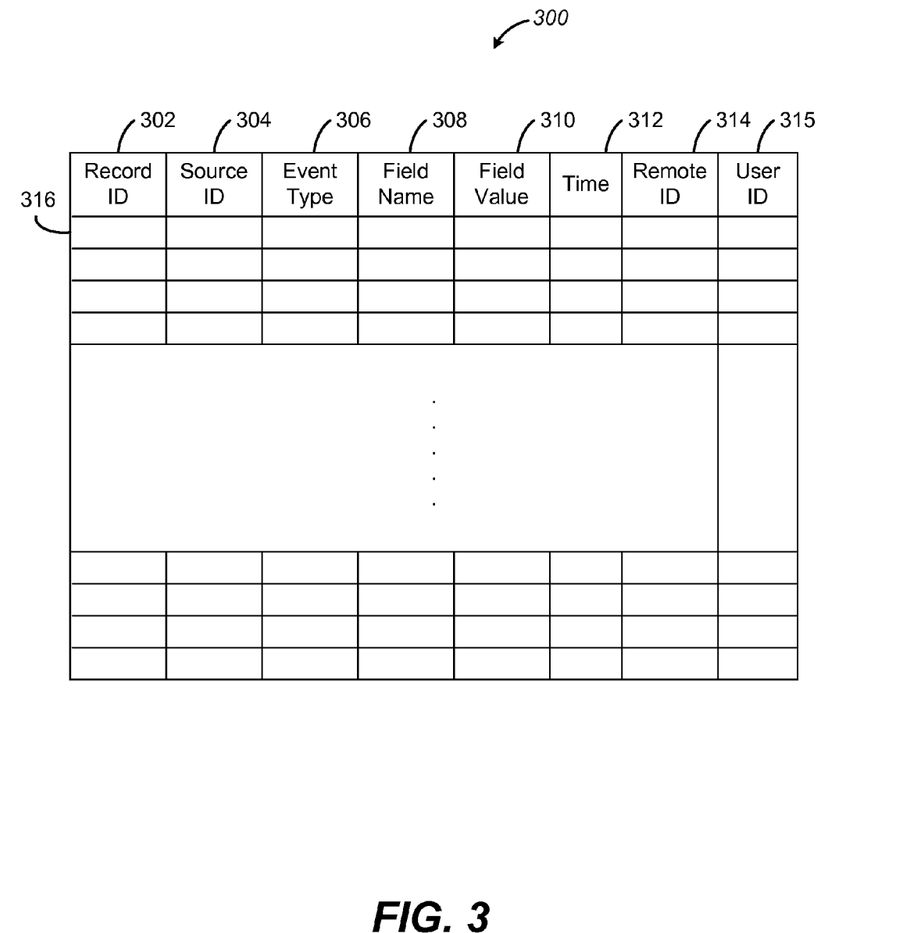
FIG. 3 illustrates an embodiment of an operations log stored in the server repository of FIG. 1.

FIG. 3 illustrates an embodiment of an operations log 300 stored in the server repository 112 of FIG. 1. As shown, the operations log 300 is organized as a table having multiple columns and rows. Specifically, the operations log 300 includes the record identifier column 302, the source identifier column 304, the event type column 306, the field name column 308, the field value column 310, the time column 312, the remote identifier column 314 and the user identifier column 315.

Each row in the operations log 300, such as row 316, represents a particular event related to a data field of a flexible record. Specifically, each row is associated with a unique combination of the values for the user identifier column 315, the field name column 308 and the time column 314. The value of the event type column 306 indicates the particular event that occurred at the time stamp indicated by the time column 314. The value of the field value column 310 indicates the value of the data field after the particular event occurred. Rows representing events related to data fields of the same flexible record share the same record identifier in the record identifier column 302. By evaluating the most recently inserted row in the operations log 300 for each data field of a given flexible record, the data management module 204 is able to determine the current state of the data field.

Figure 4:
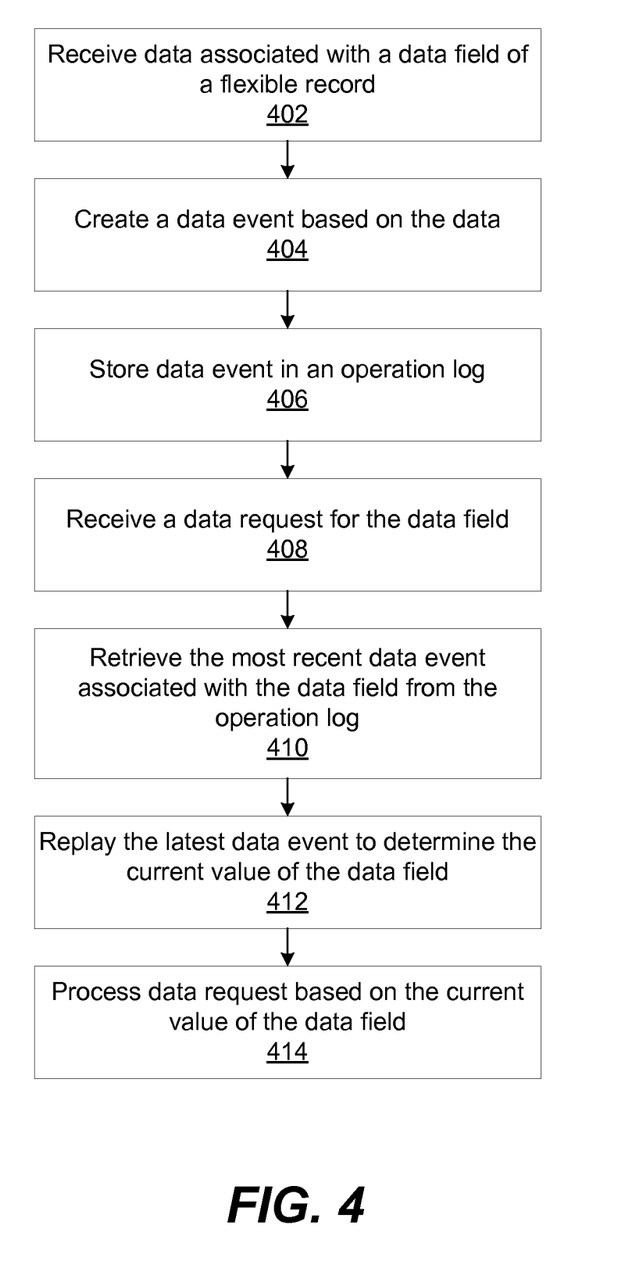
FIG. 4 illustrates an embodiment of a process for processing data requests using an operations log.

FIG. 4 illustrates an embodiment of a process for processing data requests using an operations log. At step 402, the operations log management module 204 receives data associated with a data field belonging to a flexible record. At step 404, the operations log management module 204 creates a data event based on the data associated with the data field. A data event specifies the type of operation that caused the data associated with the data field to be generated, the name of the data field, the new value of the data field and the time the operation was performed. At step 406, the operations log management module 204 stores the data event in the operations log of the server repository 112.

At step 408, the data management module 202 receives a data request for accessing the value of the data field. At step 410, the data management module 202 retrieves the most recent event associated with the data field from the operation log of the server repository 112. At step 412, the data management module 202 replays the retrieved event to determine the current value of the data field. At step 414, the data management module 202 processes the data request based on the current value of the data field.

In one embodiment, the data presentation application 114 processes data requests using the client operations log in the same manner as discussed above in conjunction with steps 402-414.

Figure 5A:
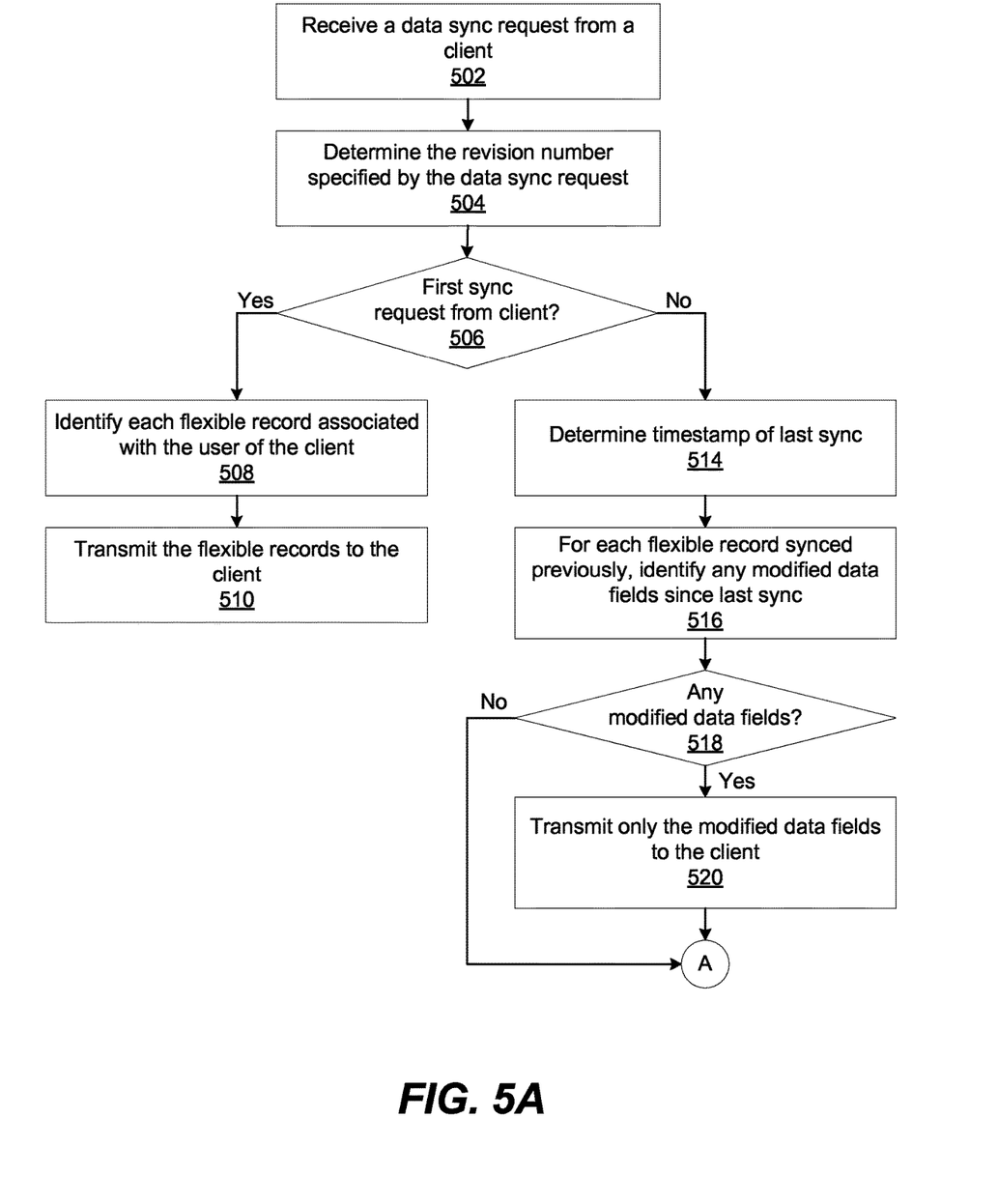
FIGS. 5A and 5B illustrate an embodiment of a process for processing data synchronization request from a client device using an operations log.
Figure 5B:
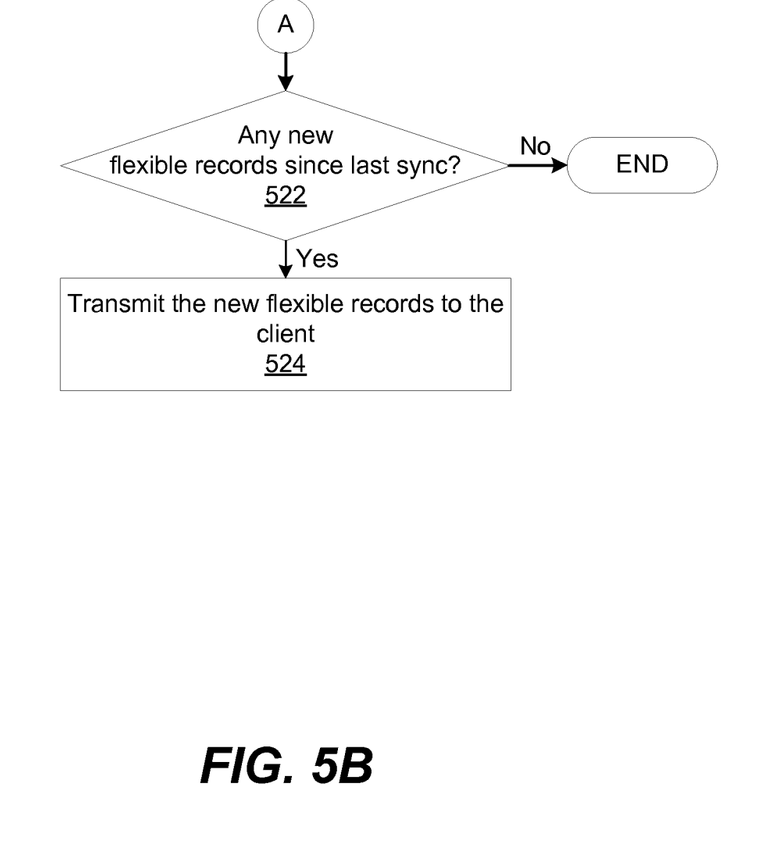

FIGS. 5A and 5B illustrate an embodiment of a process for processing data synchronization request from a client device using an operations log. At step 502, the client syncing module 210 receives a data sync request from the data presentation application 114 executing on the client device 108(0). At step 504, the client syncing module 210 determines a revision number specified by the data sync request. A revision number indicates the last time, if at all, the operations log in the server repository 112 was synced with the client operations log in the client repository 116 within the client device 108.

At step 506, the client syncing module 210 determines whether the operations log in the server repository 112 is being synced with the client operations log in the client repository 116 for the first time. If so, then the method proceeds from step 506 to step 508. At step 508, the client syncing module 210 identifies each flexible record stored in the operations log of the server repository 112 that is associated with the user of the data presentation application 114. At step 510, the client syncing module 210 transmits the identified flexible records to the client repository 116 within the client device 108.

If, at step 506, the client syncing module 210 determines that the operations log in the server repository 112 was previously synced with the client operations log in the client repository 116, then the method proceeds from step 506 to step 514. At step 514, the client syncing module 210 determines the timestamp of the last sync to the client device 108. At step 516, the client syncing module 210 identifies, for each flexible record previously synced to the client operations log, any data fields that were modified since the last sync.

At step 518, if one or more data fields were modified since the last sync, then the method proceeds to step 520. At step 520, the client syncing module 210 transmits only the modified data fields to the client operations log for storage. At step 518, if no data fields were modified since the last sync, then the method proceeds directly to step 522.

At step 522, the client syncing module 210 determines whether any new flexible records associated with the user were added to the operations log in the server repository 112 since the last sync. If so, then, at step 524, the client syncing module 210 transmits the new flexible records to the client operations log for storage. If not, then the method ends.

Example: Contact Information Aggregation

The techniques described above may be used to aggregate contact information dispersed across multiple contact data sources. Each contact data source may store individual contact information according to a different schema.

Figure 6A:
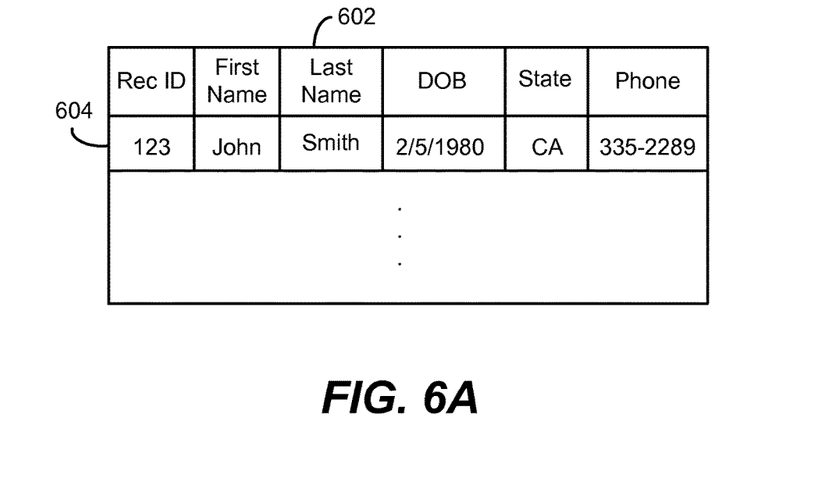
FIGS. 6A-6C illustrate an example of contact information aggregation using the techniques described in conjunction with FIGS. 1-5.
Figure 6B:
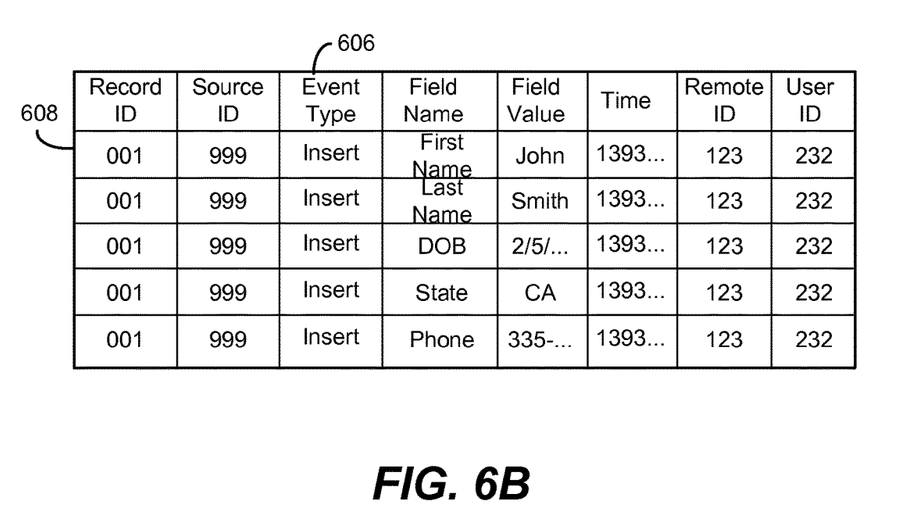
Figure 6C:
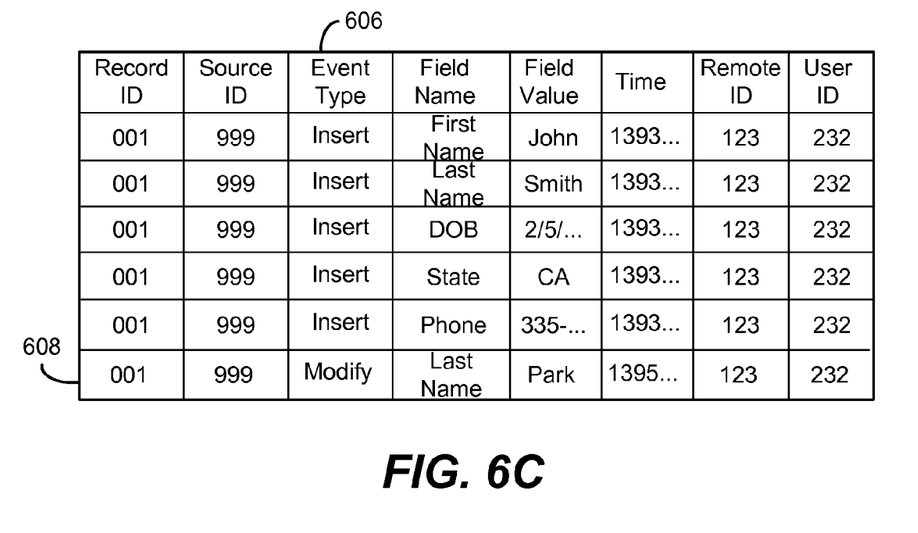

FIGS. 6A-6C illustrate an example of contact information aggregation using the techniques described in conjunction with FIGS. 1-5. Specifically, FIG. 6A illustrates a database table 602 in a contact data source. The table 602 has a specific schema, where each record in the table, such as record 604, stores information about a particular contact. The information includes a first name, a last name, a date of birth, a state and a phone number. A different contact data source may store contact information in a different structure or may have a subset or a superset of the information stored in the table 602.

The data management module 202 retrieves contact information stored in the table 602 from the contact data source. The data management module 202 then processes the contact information to generate a flexible record. As discussed above, a flexible record stores data fields of a given record separately and all the data fields of the flexible record are associated with the same record identifier. For contact record 604 in FIG. 6A, the data management module 202 creates a different insert event for each field of the generated flexible record and transmits the insert events to the operations log management module 204 for storing in the operations log 606.

FIG. 6B illustrates the insert events associated with the insertion of contact record 604 in the operations log 606. For example, row 608 in the operations log 606 stores the data corresponding to the first name data field in content record 604. As shown, for the record 604, the record identifier in the operations log 606 is the same, i.e., record identifier "001". Further, the all rows associated with the record identifier "001" also store the source identifier, i.e., the identifier associated with the contact data source, and the remote identifier, i.e., the record identifier in the contact data source.

FIG. 6C illustrates a modify event 608 associated with the modification of the last name data field inserted in the operations log 606. In operation, the flexible record associated with contact record 604 may be transmitted to a client device 108 associated with a user to whom the contact record 604 belongs. The user may modify a data field, such as the last name data field, in the flexible record. As shown, the modifications are synchronized with the operations log 606.

Example Computer Machine Architecture

Figure 7:
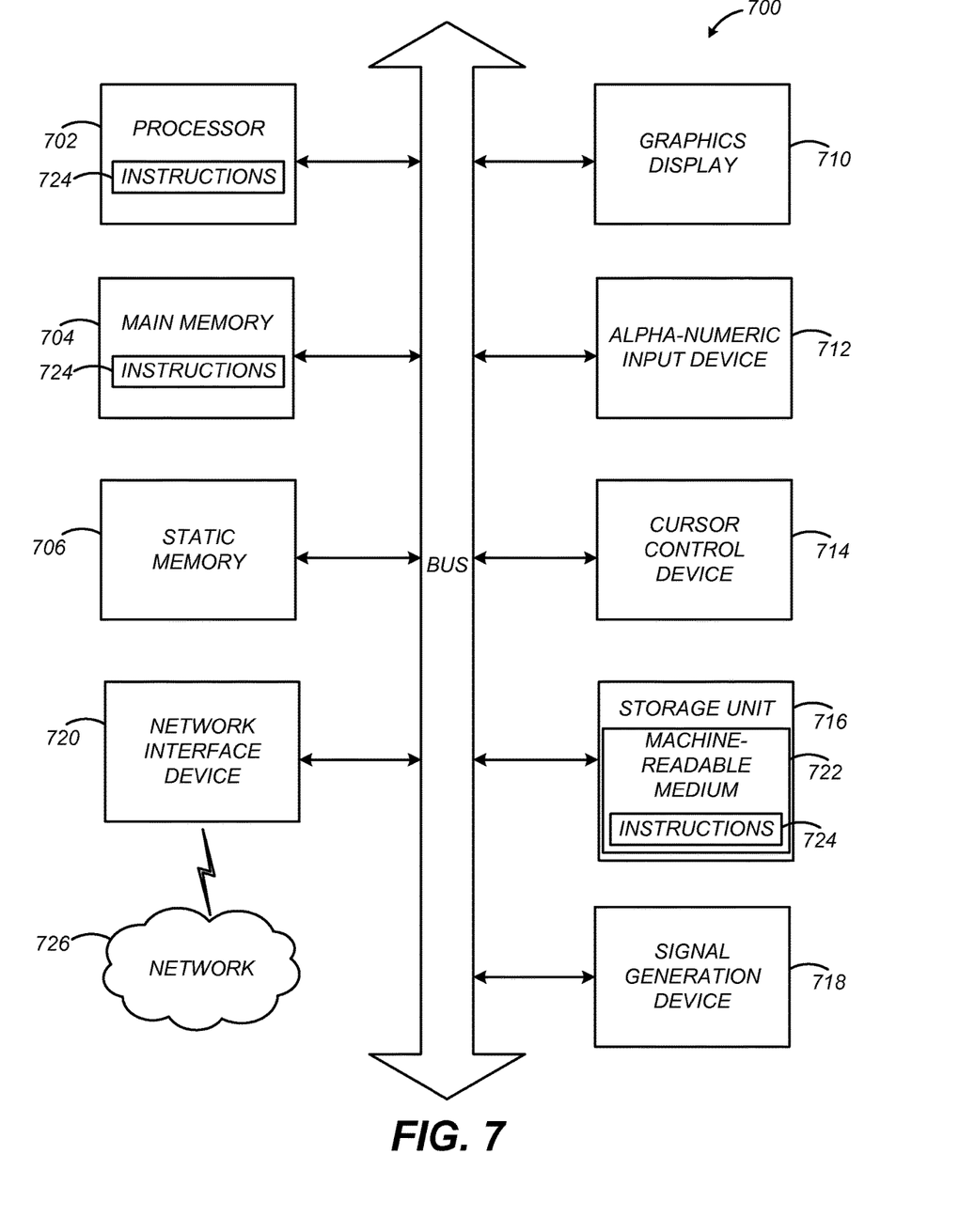
FIG. 7 illustrates one embodiment of components of an example machine able to read instructions from a machine-readable medium and execute them in a processor (or controller).

The disclosed system, software structures and processes described with FIGS. 1-5 are configured for operation on a machine, e.g., a computing system. FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a mobile computing devices such as a tablet computer, an ultrabook (or netbook) computer, a personal digital assistant (PDA), a cellular telephone, a smartphone, a web appliance, or like machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processors 702 (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 700 also includes a main memory 704 and a static memory 706. The components of the computing system are configured to communicate with each other via a bus 708. The computer system 700 may further include graphics display unit 710 (e.g., a plasma display panel (PDP), a liquid crystal display (LCD)) which may be configured for capacitive or inductive touch sensitivity to allow for direct interaction with software user interfaces through the display 710. The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

An advantage of the configurations as disclosed is that the data fields are stored as flexible records and not in a rigid schema. Consequently, changes to the individual data fields and/or schema changes in the various data sources can be managed by simply updating individual data fields without requiring infrastructure level modifications.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 702) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for persisting data received from different data sources through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for persisting data received from different data sources, the method comprising:
   receiving, at a data aggregation server, data from a plurality of data sources having a plurality of schemas, the data including a plurality of data fields, and at least two of the data fields being structured according to different schema of the plurality of schema;
   automatically, in response to receiving the data from the plurality of data sources:
      aggregating a subset of the plurality of data fields that are relevant to an object stored by the data aggregation server;
      generating a record identifier associated with the object;
      generating a different insert event associated with each data field of the aggregated subset of data fields, each insert event including a value corresponding to the associated data field; and
      storing each insert event in a different row of an operation log stored by the data aggregation server, each row including the record identifier, a field name corresponding to the data field associated with the insert event stored in the row, the value corresponding to the data field, and a timestamp of when the insert event occurred;
   receiving, from a client device, a first data request for accessing a value corresponding to a data field of the aggregated subset of data fields;
   in response to receiving the first data request, automatically transmitting, to the client device, the value included in the identified row in response to the first data request;
   generating a modify event in a new row of the operation log, the new row including the record identifier, the field name corresponding to the data field associated with the modified value, a modified value, and a timestamp of when the modify event occurred;
   identifying a row in the operation log that stores a most recent event associated with the data field corresponding to the modified value; and
   responsive to identifying the row associated with the modify event as the most recent event, transmitting, to the client device, the modified value.

2. The method of claim 1, further comprising transmitting a modification update to one or more of the plurality of data sources, the modification update comprising the modified value.

3. The method of claim 1, wherein each of the plurality of data sources is one of a customer relationship management system or a human resource management system.

4. The method of claim 1, wherein each of the plurality of data sources is associated with a different schema of the plurality of schema.

5. The method of claim 1, wherein the object is one of a contact, a document, or a calendar item.

6. The method of claim 1, wherein each row in the operation log comprises a user identifier associated with a user associated with the data.

7. The method of claim 1, wherein identifying a row in the operation log that stores a most recent event comprises identifying a modify event of a plurality of modify events as a most recent event, each of the plurality of modify events comprising a different modified value for the data field.

8. The method of claim 7, wherein the identified modify event is identified based on timestamps of the plurality of modify events.

9. The method of claim 1, wherein each row in the operation log comprises an event type.

10. The method of claim 1, wherein each row in the operation log comprises a source identifier associated with one of the plurality of data sources.

11. A non-transitory computer readable medium comprising instructions that, when executed by a processor, cause the processor to:
   receive, at a data aggregation server, data from a plurality of data sources having a plurality of schemas, the data including a plurality of data fields, and at least two of the data fields being structured according to different schema of the plurality of schema;
   automatically, in response to receiving the data from the plurality of data sources:
      aggregate a subset of the plurality of data fields that are relevant to an object stored by the data aggregation server;
      generate a record identifier associated with the object;
      generate a different insert event associated with each data field of the aggregated subset of data fields, each insert event including a value corresponding to the associated data field; and
      store each insert event in a different row of an operation log stored by the data aggregation server, each row including the record identifier, a field name corresponding to the data field associated with the insert event stored in the row, the value corresponding to the data field, and a timestamp of when the insert event occurred;
   receive, from a client device, a first data request for accessing a value corresponding to a data field of the aggregated subset of data fields;
   in response to receiving the first data request, automatically transmit, to the client device, the value included in the identified row in response to the first data request;
   generate a modify event in a new row of the operation log, the new row including the record identifier, the field name corresponding to the data field associated with the modified value, a modified value, and a timestamp of when the modify event occurred;

identify a row in the operation log that stores a most recent event associated with the data field corresponding to the modified value; and responsive to identifying the row associated with the modify event as the most recent event, transmit, to the client device, the modified value.

12. The computer readable medium of claim 11, wherein the instructions further cause the processor to transmit a modification update to one or more of the plurality of data sources, the modification update comprising the modified value.

13. The computer readable medium of claim 11, wherein each of the plurality of data sources is one of a customer relationship management system or a human resource management system.

14. The computer readable medium of claim 11, wherein each of the plurality of data sources is associated with a different schema of the plurality of schema.

15. The computer readable medium of claim 11, wherein the object is one of a contact, a document, or a calendar item.

16. The computer readable medium of claim 11, wherein each row in the operation log comprises a user identifier associated with a user associated with the data.

17. The computer readable medium of claim 11, wherein the instructions for identifying a row in the operation log that stores a most recent event further comprise instructions that cause the processor to identify a modify event of a plurality of modify events as a most recent event, each of the plurality of modify events comprising a different modified value for the data field.

18. The computer readable medium of claim 17, wherein the identified modify event is identified based on timestamps of the plurality of modify events.

19. The computer readable medium of claim 11, wherein each row in the operation log comprises an event type.

20. The computer readable medium of claim 11, wherein each row in the operation log comprises a source identifier associated with one of the plurality of data sources.

* * * * *